Figure 1:
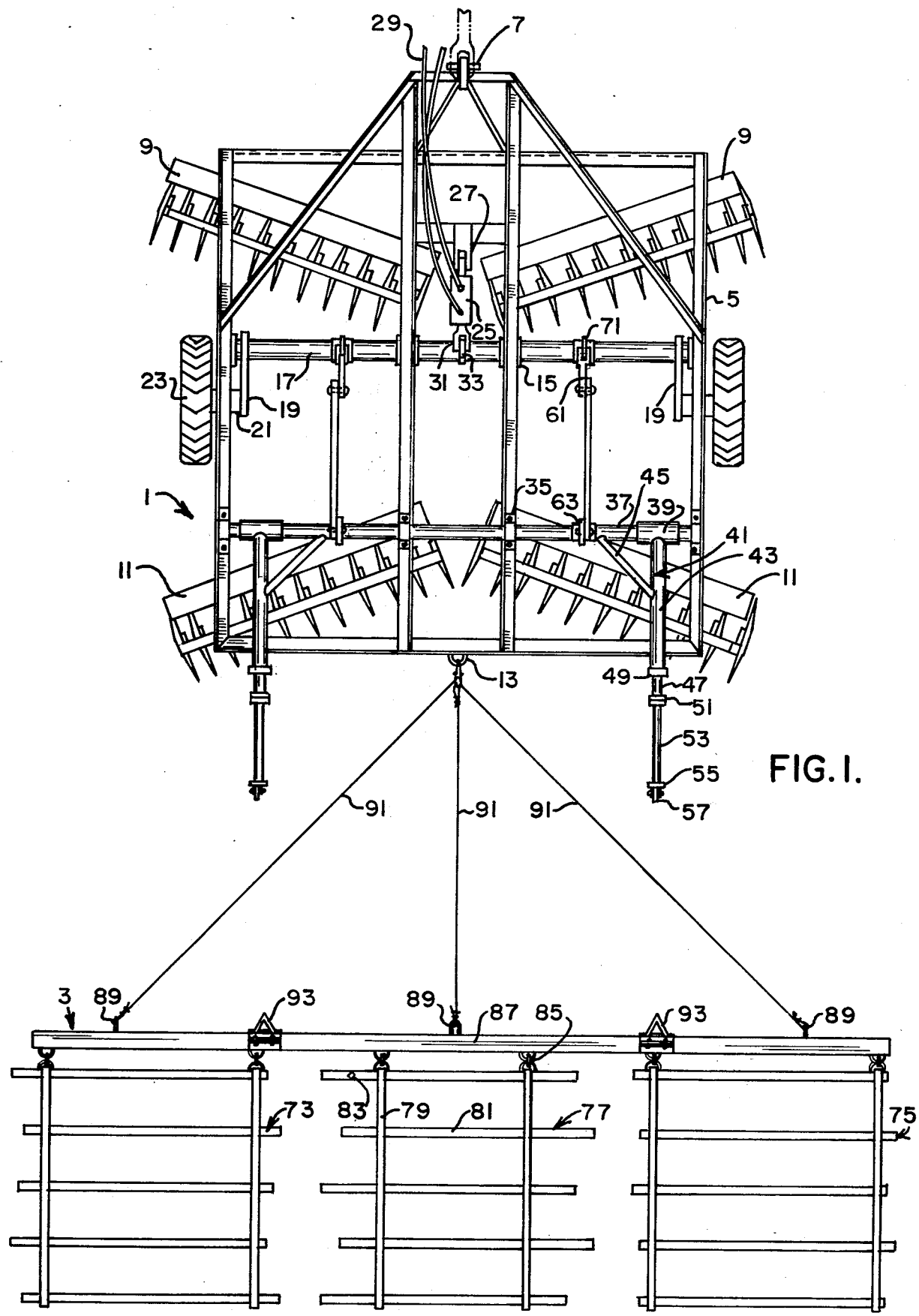

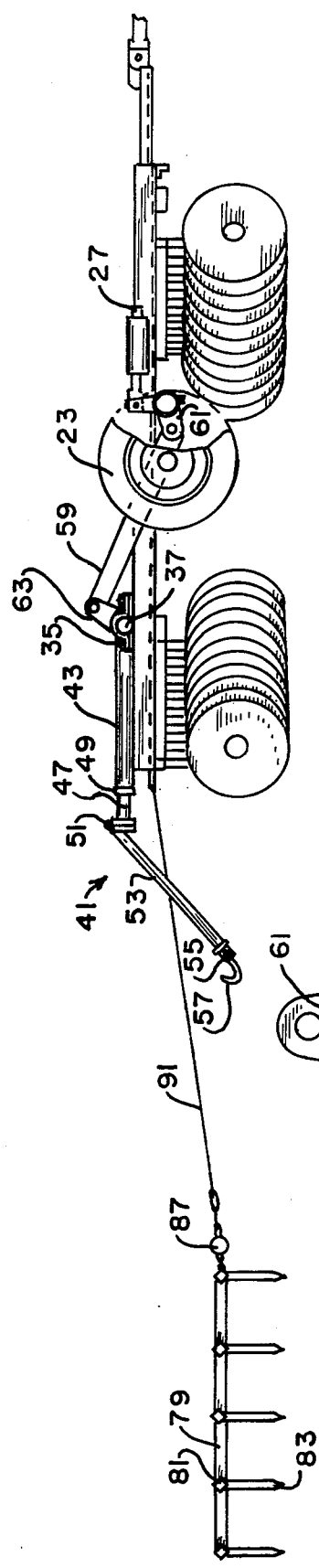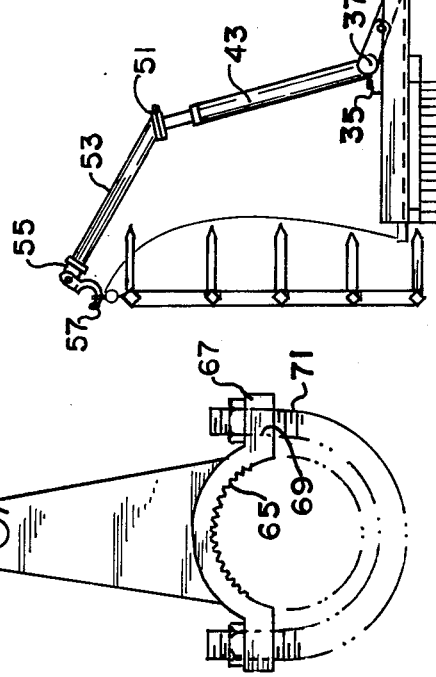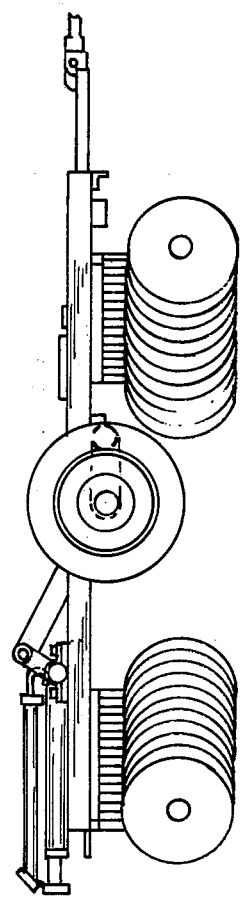

LIFT FOR DRAGGED IMPLEMENT

BACKGROUND OF THE INVENTION

This invention relates to a device for transporting a piece of farm equipment, such as a drag harrow, which is pulled behind another piece of farm equipment, such as a disc harrow, having retractable wheels for transporting it.

In the preparation of soil for planting, a discing operation is frequently followed by breaking up clods, pulverizing the soil, and leveling the soil with a drag harrow. To avoid the necessity of carrying out two separate operations, the drag harrow may be pulled behind the disc harrow. This arrangement does an excellent job of preparing the soil. When the tandem implements must be moved from a field, however, difficulties arise. Disc harrows are generally provided with retractable wheels, powered by an hydraulic cylinder, which control the depth of the disc blades. Fully lowering the wheels raises the disc blades above the ground and permits the disc harrow to be transported. Traditionally, the drag harrow is disassembled and its individual sections are inverted and lifted onto the top of the disc harrow for transport. Alternatively, the drag harrow is left in the field and later transported separately. Neither approach is very satisfactory. The drag harrow sections are heavy and awkward to handle. For example, a 15 foot disc harrow may require a drag harrow having a central section about 5 feet wide and two outer sections each 6 feet wide, all connected to a 17 foot drawbar. Since each section is approximately square and weighs about 100 pounds, lifting the sections for transport is a difficult and time-consuming job.

Attempts have been made to design a drag harrow which may easily be transported with a disc harrow. Such devices are shown, for example, in U.S. Pat. Nos. 3,090,447 and 3,090,448 to Hotchkiss, Jr.. In these prior art systems, however, the drag harrow has been limited in length, width and type of construction, and the drag harrow of such systems has thus been less effective than the usual drag harrow. The combination of the two harrows is also less maneuverable than the usual tandem disc harrow and drag harrow. Just as important, the combination is difficult to transport because of the length, width and rigidity of the combined structure, particularly when gates have been built only large enough to accommodate the disc harrow.

SUMMARY OF THE INVENTION

One of the objects of this invention is to provide a means of transporting a dragged farm implement such as a drag harrow which is pulled behind another implement, such as a disc harrow, of the type having retractable wheels for transporting it.

Another object is to provide such a means which does not sacrifice any of the operating characteristics of either implement.

Another object is to provide such a means which enables the combined implements to be transported substantially as easily as the wheeled implement alone, even when the dragged implement is wider than the wheeled implement.

Another object is to provide such a means which is rugged and simple and which can easily be installed on existing wheeled implements if desired.

Another object is to provide such a means which is usable with a wide variety of existing wheeled implements and dragged implements.

Other objects will occur to those skilled in the art in light of the following description and accompanying drawings.

In accordance with this invention, generally stated, improved lift means are provided for transporting a generally horizontal dragged farm implement of the type which is pulled behind a wheeled implement having retractable wheels and operating means for retracting and lowering the wheels. The lift means comprise arm means pivotably mounted on the wheeled implement for releasably engaging the dragged implement and carrying it suspended in a generally vertical position, and linkage means for operatively connecting the arm means to the operating means for retracting and lowering the wheels of the wheeled implement.

In the preferred embodiment, the dragged implement is a drag harrow, including a plurality of sections attached to a drawbar. Typical drag harrows are shown in brochure AD-31130-A 3/72 entitled International ® Peg-Tooth Harrows (International Harvester Company, Chicago, Illinois). Such harrows are attached to a single tie point, a considerable distance ahead of the harrow, for proper pivoting of the harrow on turns.

In the preferred embodiment, the wheeled implement is a disc harrow, such as those described in brochure AD-3686-D-7 2/75 entitled International Wheel-Controlled Disk Harrows (International Harvester Company). Such harrows include a frame which carries gangs of disc blades. The frame is mechanically attached to a tractor through a hitch. An hydraulic cylinder on the frame is attached by hydraulic lines to a pump on the tractor. The hydraulic cylinder rotates a transverse horizontal bar, the ends of which carry legs on which the wheels are mounted.

The preferred lift of the present invention includes a pair of rearwardly-extending arms, the forward ends of which are connected to a second rotatable bar. A linkage between the two rotatable bars causes the arms to rotate through an angle of more than 45°, preferably about 70° ± 10°, from a generally horizontal position to a generally vertical position when the wheels are moved to their lowered, transport, position. The arms are of a substantial length, on the order of 3 to 6 feet long, sufficient to suspend the drag harrow vertically by its drawbar when the disc harrow is raised to its transport position.

When the disc and drag harrow are in use, the drag harrow is released from the arms and is pulled a considerable distance, on the order of 5 to 10 feet, behind the disc harrow by tow lines attached to a common tie point on the rear of the disc harrow. Hinges in the arms permit the arms to be folded back onto the frame of the disc harrow. When the harrows are to be transported, the disc harrow is backed sufficiently close to the drag harrow that releasable engagement means (e.g. hooks) at the free ends of the arms engage the drawbar of the drag harrow. As the wheels of the disc harrow are lowered, the drag harrow is raised to its suspended vertical position. Dog legs and telescopic joints in the arms permit considerable lateral motion of the free ends of the arms, and thereby permit the suspended drag harrow to be shifted laterally to either side as the rig is taken through a gate narrower than the drag harrow. The dog legs also position the hooks at the free ends of the arms near ground level, so that the drag harrow wheel-actuating shaft 17, thereby lowering the wheels 23 and raising the arms 41, as shown in FIG. 4. It will be seen that the initial lifting movement of the harrow 3 is nearly vertical, so that the teeth 83 tend to be lifted out of the ground.

In its transport position, shown in FIG. 4, the harrow 3 hangs freely in a vertical position from the hooks 57. In this position, the drag harrow 3 adds very little to the total length of the disc harrow and does not seriously disturb the weight distribution of the disc harrow 1. If a gate narrower than the drag harrow 3 should be encountered, the angle between sections 47 and 53 of the arms 41 and the telescopic fit of the sections 47 in the tubes 43 permit the arms 53 to be pivoted to the right or left to allow one side of the harrow 3 to pass through the gate, and then permit the arms to pivot to the other side to allow the rest of the drag harrow 3 to pass through.

The drag harrow is easily returned to its operative position by simultaneously raising the wheels 23 and pulling the disc harrow 1 forward. The drawbar 87 is lifted off hooks 57, the arms 41 are folded back along hinges 51, and the harrows are ready for use.

The drag harrow 3 is readily separated from the disc harrow 1 by disconnecting the lines 91 from the rear hitch 13. When the drag harrow is not in use, the arms may be kept in their folded-back position to add weight to the disc harrow, or the pipes 47 may be pulled from tubes 43 and stored. If desired, the linkage arms 59 may be disconnected, to prevent the arms 41 from moving with the wheels 23.

Numerous variations in the implement lift of this invention, within the scope of the appended claims, will occur to those skilled in the art in light of the foregoing disclosure. Merely by way of example, the lift may be mounted on other tillage implements with retractable wheels, such as field cultivators and chisel plows. The construction of the arms 41 may be altered without losing all the advantages of the present invention. The dogs 61 and 63 may be welded to their respective shafts, or other linkage may be employed. To make the lift more easily adaptable to different sizes and types of implements, and to avoid the necessity of any welding, all of the parts may be bolted together. For example, not only the dogs 61 and 63, but also the sleeves 39 and braces 45 may be bolted to the shaft 37, to permit the arms to be moved laterally; the sleeves 39, hinges 51 and clevises 55 may all be castings including stubs which slide into the tubes and pipes 43, 47 and 53 respectively and are bolted in place; the pillow blocks 35 may be replaced by sleeve bearings held to the top of the disc harrow frame 5 by U-bolts held by mounting plates below the frame. The arms may be closer together to accomodate wings on the disc harrow. Different types of drag harrows may be employed. The drawbar may be foldable, and the drag harrow may be transported folded. If less flexible tie lines 91 are used, they may be unhooked from the tie point 13 before the harrow is lifted. Although the use of the lift of the present invention with a wheeled implement is for many reasons preferred, at least some of the advantages of the lift may also be enjoyed when it is used on a non-wheeled tillage implement having a two or three-point hitch for lifting the implement. These variations are merely illustrative.

I claim:

1. In combination with a farm implement having transporting wheels and actuating means for selectively lowering said wheels to a ground-engaging transport position, said implement further including hitch means for dragging a generally horizontal towed implement behind said wheeled farm implement, said hitch means comprising a plurality of flexible ties connected to a common tie point on said wheeled farm implement, improved lift means for transporting said dragged implement independent of said hitch means, said lift means comprising arms pivotably mounted on the wheeled farm implement, engagement means on said arms for releasably engaging aligned connections on said dragged implement, and linkage means operatively connecting said arms to said actuating means for raising said arms sufficiently to carry said dragged implement suspended by said engagement means in a generally vertical position when said actuating means lower said wheels to said transport position.

2. The combination of claim 1 wherein said dragged implement is a drag harrow.

3. The combination of claim 2 wherein said drag harrow comprises a plurality of sections attached to a drawbar, said ties connecting said drawbar to said common tie point, and wherein said engagement means on said arm means are constructed and arranged to suspend said drag harrow by said drawbar.

4. In combination with a farm implement having transporting wheels and actuating means for selectively lowering said wheels to a ground-engaging transport position, improved lift means for transporting a generally horizontal dragged implement adapted to be pulled behind said wheeled farm implement, said lift means comprising rotatable transverse shaft means mounted on the wheeled implement, and a pair of rearwardly extending arms, the forwrd ends of said arms being connected to said shaft means; engagement means on said arms for releasably engaging said dragged implement, and linkage means operatively connecting said arms to said actuating means for raising said arms sufficiently to carry said dragged implement suspended by said engagement means in a generally vertical position when said actuating means lower said wheels to said transport position, said linkage means comprising means for rotating said shaft means in response to movement of said wheels.

5. The combination of claim 4 wherein said arms comprise hinge means for hinging at least a part of said arms onto said wheeled farm implement when said dragged implement is released from said arms.

6. The combination of claim 4 including telescopic joint means in said arms and bends in said arms for permitting said arms to pivot side-to-side when said arms carry said dragged implement.

7. In combination with a farm implement having transporting wheels connected to transverse actuating shaft means for raising and lowering said wheels, and actuating means for selectively lowering said wheels to a ground engaging transport position, said actuating means comprising hydraulic cylinder means for rotating said actuating shaft means, improved lift means for transporting a generally horizontal dragged implement adapted to be pulled behind said wheeled farm implement, said lift means comprising arm means pivotably mounted on the wheeled implement, and a pair of rearwardly extending arms, the forward ends of said arms being connected to said shaft means; engagement means on said arms for releasably engaging said dragged implement, and linkage means operatively connecting said arms to said actuating means for raising said arms sufficiently to carry said dragged implement suspended by said engagement means in a generally vertical position when said acutting means lower said wheels to said transport position, said linkage means comprising mechanical linkage means between sid actuating shaft means and said arm-carrying shaft means for rotating said shaft means in response to movement of said wheels.

8. The combination of claim 7 wherein said wheeled farm implement is a disc harrow.

9. The combination of claim 7 wherein said linkage means comprise at least one dog bolted to said actuating shaft means and at least one dog bolted to said arm-carrying shaft means, and an arm pivotally connected between said dogs.

10. Lift means adapted to lift a generally horizontal harrow and carry said harrow suspended generally vertically behind a tillage implement, said implement comprising transport wheels connected to transverse actuating shaft means for raising and lowering said wheels, said lift means comprising transverse lift shaft means adapted to be rotatably mounted on said tillage implement rearwardly of said actuating shaft, rearwardly extending arms, the forward ends of said arms being mounted on said lift shaft, engagement means at the rearward ends of said arms for releasably engaging said ahrrow, and linkage means for rotating said lift shaft to raise and lower said arms, said linkage means comprising first lever arm means attached to said lift shaft, second lever arm means adapted to be attached to said actuating shaft means and link means for pivotably connecting said first lever arm and said second lever arm, whereby when said lift means is secured to said implement and said second lever arm is secured to said actuating shaft means, the lowering of said transport wheels will rotate said lift shaft to raise said arms.

11. The lift means of claim 10 wherein said arm means include dog legs such that, in the lowered position of said arm means, the forward parts of said arm means are horizontal and the rearward parts of said arm means extend downwardly into close proximity of the ground.

12. The lift means of claim 10 wherein said arm means are from about 3 to 6 feet long and wherein said linkage means rotate said shaft means about 60° to 80° from a lowered position of said arm means to a raised position of said arm means.

* * * * *

UNITED STATES PATENT AND TRADEMARK OFFICE
CERTIFICATE OF CORRECTION

PATENT NO. : 4,113,028
DATED : September 12, 1978
INVENTOR(S) : Robert D. Glueck It is certified that error appears in the above-identified patent and that said Letters Patent are hereby corrected as shown below:

Column 6, line 33, delete "forwrd" and insert --- forward ---

Column 7, line 4, delete "sid" and insert --- said ---

Column 8, line 3, delete "ahrrow" and insert ---harrow---

Signed and Sealed this

Fifth Day of June 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,113,028
DATED : September 12, 1978
INVENTOR(S) : Robert D. Glueck It is certified that error appears in the above-identified patent and that said Letters Patent are hereby corrected as shown below:

Column 6, line 33, delete "forwrd" and insert --- forward ---

Column 7, line 4, delete "sid" and insert --- said ---

Column 8, line 3, delete "ahrrow" and insert ---harrow---

Signed and Sealed this

Fifth Day of June 1979

[SEAL]

*Attest:*

RUTH C. MASON
*Attesting Officer*

DONALD W. BANNER
*Commissioner of Patents and Trademarks*